Nov. 6, 1956 R. L. CAWOOD 2,769,623
TURBINE MIXER
Filed March 8, 1955
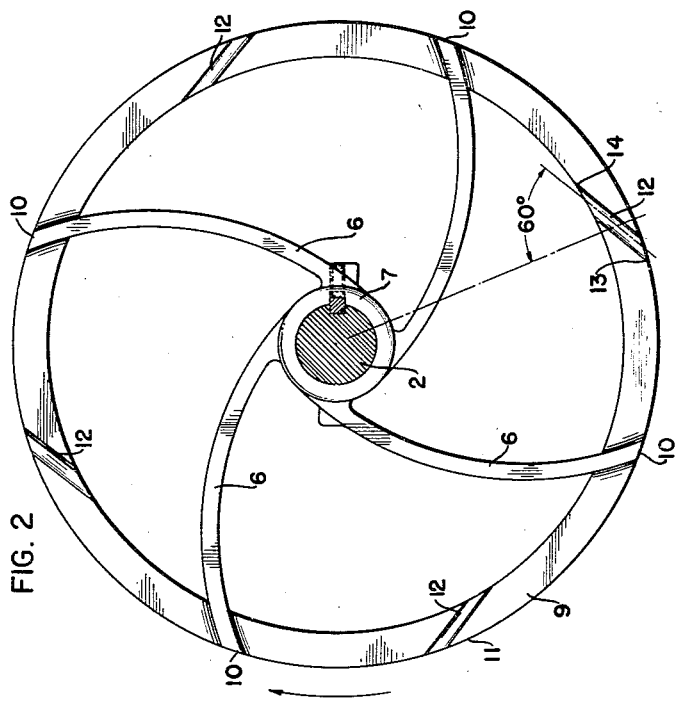
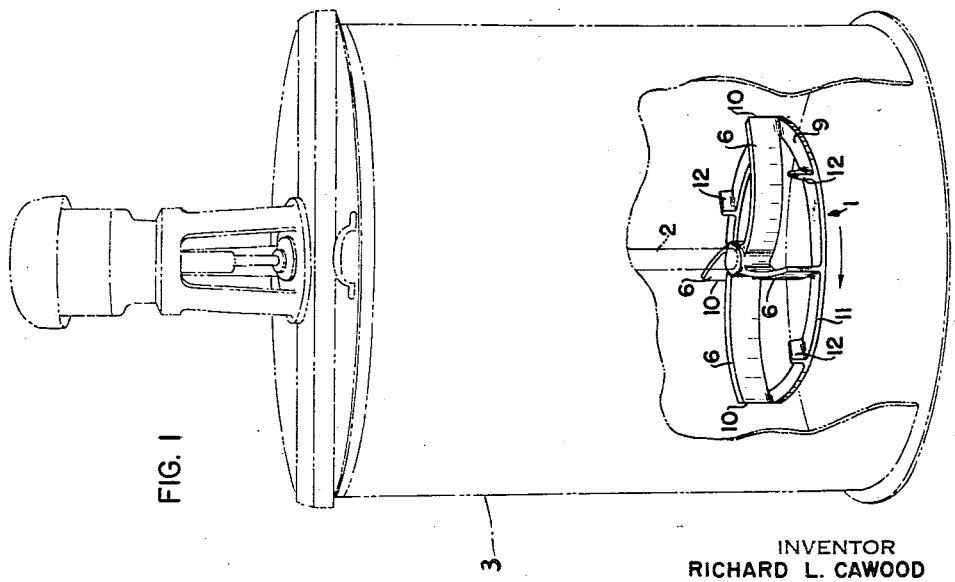
INVENTOR
RICHARD L. CAWOOD

United States Patent Office 2,769,623
Patented Nov. 6, 1956

2,769,623

TURBINE MIXER

Richard L. Cawood, East Liverpool, Ohio, assignor to The Patterson Foundry & Machine Co., East Liverpool, Ohio, a corporation of Ohio Application March 8, 1955, Serial No. 492,999

3 Claims. (Cl. 259—134)

This invention relates to turbine mixers used in liquid mixing, blending and related operations. More particularly, the invention is concerned with a turbine having an improved arrangement of agitating and shearing blades which promote a high degree of shearing action on lumps or agglomerations in liquids, thereby increasing liquid mixing efficiency and speed.

In the mixing of materials containing a relatively high percentage of lumps or agglomerations, agitation alone as with mechanical devices usually does not suffice to provide the degree of mixing required for many types of materials. The improved turbine mixer of the invention induces a high order of shearing action of the agglomerations or lumps by direct impact and shearing action of the blades resulting in more efficient and better mixing.

The invention provides an improved turbine mixer which comprises a plurality of curved agitating blades attached to a centrally disposed hub, which impart a high degree of centrifugal action in various liquids undergoing mixing. The agitating blades have a substantial curved slope with respect to radii extending from their hub, presenting a convex forward face. A supporting ring concentric with the hub is attached below and at the radial extremities of the agitating blades. A plurality of shearing blades are provided on the ring intermediate the peripheral extremities of the agitating blades. Each of the shearing blades is mounted on the ring in an angularly disposed position to extend generally in the direction of the adjacent rearward agitating blade. The shearing blades have sharply formed leading and trailing edges which shear lumps or agglomerations dispersed in the liquid. In addition to over-all reenforcement for the agitating blades and a mounting for the shear blades, the ring provides substantial axial clearance between the blades, their hub and the ring itself, permitting axial as well as radial freedom of motion for the mixing medium.

In the accompanying drawings:

Fig. 1 is a perspective from above of a turbine mixer embodying the invention; and Fig. 2 is a plan view of the turbine illustrated in Fig. 1.

The improved turbine mixer 1 of the invention is secured at the lower end of a mixer shaft 2 located within a mixing vessel 3 and can be driven by any suitable power means. The turbine mixer is usually located generally at the lower extremity of the mixing vessel and may be offset from the periphery of the cylindrical walls thereof to permit substantial radial travel, as well as axial travel of the liquids undergoing mixing.

The turbine mixer is preferably formed as an integral unit which may advantageously be cast as a unitary casting. The turbine mixer comprises a plurality of agitating blades 6 connected to and emanating from a centrally disposed hub 7 and extending radially in a cruved manner. The agitating blades are uniformly spaced about the hub and have a substantially curved slope with respect to radii of the hub providing convexed forward faces, in order to impart axial as well as radial flow and centrifugal action to the liquid. The required slope of the agitating blades will depend in each instance on the viscosities or consistencies of the mixing medium. A ring 9 is provided as the lateral extremities of the agitating blades and lies in a plane substantially normal to the axis of the hub 7, the ring being preferably located on the outermost portion of the radial edges of the agitating blades 6 so that the peripheral edges 10 of the blades 6 and the peripheral edge 11 of the ring define a common cylindrical surface.

A plurality of shearing blades 12 are mounted on the supporting ring and are spaced substantially intermediate the faces of the adjacent agitating blades. The shearing blades are mounted over the ring at a preferred angle of about 60° with respect to radii from the hub, as shown in Fig. 2, and extend generally in the direction of the adjacent rearward agitating blades. The shearing blades have sharpened leading edges 13 and sharpened trailing edges 14. The required angular position of the shearing blades with respect to the agitating blades will be determined by the general course of travel of the lumps or agglomerations created by rotation of the turbine mixer and the curved slope of the agitating blades 6.

The hub 7 of the turbine mixer may be mounted in any well known manner at the lower extremity of the mixer shaft 2 and the turbine may be driven at any suitable speed and in the direction of the arrow, so that the convex faces of the agitating blades 6 contact the liquid and induce effective turbulence and centrifugal action.

As the liquid and the lumps or agglomerations dispersed therein are agitated and displaced by the agitating blades 6, lumps or agglomerations in the vicinity of the peripherally traveling shearing blades 12 engage the edges thereof and are sheared directly. Of course, the usual degree of break-up of the lumps or agglomerations is provided by direct contact with the agitating blades 6. However, the shearing blades 12 greatly accelerate the rate of break-up of these lumps or agglomerations and promote mixing efficiency and economy. The sharp leading edges 13 shear lumps which they engage directly. The agitating blades centrifuge lumps of material or agglomerations toward the periphery of the turbine, and in doing so much of the material is thrown forcibly against the sharp trailing edges 14 thus cutting the lumps, breaking up agglomerates and otherwise promoting a more rapid dispersion or dissolving of same.

Thus, because of the particular arrangement of blades of the turbine mixer of the invention, there is an effective shearing of the liquid undergoing mixing resulting in a breaking up and dissolving of lumps and agglomerates. The turbine mixer may be used very effectively and with notable advantages in paint and lacquer mixing, mixing solvents, blending liquids such as oils and colors, and the like.

It will be noted that the ring 9 rigridly reenforces the agitating blades 6 against excessive stresses caused by unusual viscosities or concentrations of lumps or agglomerates experienced in the mixing operation. Additionally, the ring itself provides a permanent and rigid mounting for the shearing blades 12. The ring, being provided at the periphery of the agitating blades and shearing blades, provides a maximum of space between the blades, and thereby results in improved circulation axially as well as radially in the mixing medium. Components of the mixing turbine gas thus advantageously located to provide the greatest over-all mixing efficiency and speed, and are integrated in a structuarlly compatible relation which does not increase over-all weight and power requirements.

Although the drawings show the outer edges 10 of the agitating blades, the outer edges 13 of the shearing blades 12, and the peripheral edge 11 of the supporting ring as part of a common cylindrical outline, under certain conditions it will be desirable to extend the outer edges of either the shearing blades or the agitating blades or both beyond the periphery of the supporting ring. Similarly, although shearing blades 12 are shown having a height substantially less than the height of the agitating blades, in some instances it will be desirable to substantially increase the height of the shearing blades with respect to the agitating blades.

I claim:

1. A turbine mixer for mixing liquids which comprises a plurality of curved agitating blades attached to and extending outwardly from a centrally disposed hub and uniformly spaced circumferentially, the leading faces of said agitating blades being convex to impart a centrifugal action to the liquid, a supporting member provided at the outer extremities of the agitating blades and concentric with the hub, and a plurality of sheer blades mounted on the supporting member intermediate the agitating blades and having sharply formed leading and trailing edges, said shear blades being mounted on the supporting member so as to extend in the direction of the adjacent rearward agitating blades and being in the plane of rotation of the agitating blades.

2. A turbine mixer for mixing liquids which comprises a plurality of curved agitating blades attached to and extending outwardly from a centrally disposed hub and uniformly spaced circumferentially, the leading faces of said agitating blades being convex to impart centrifugal action to the liquid, a supporting ring provided at the outer extremities of the agitating blades and concentric with the hub, and a plurality of shear blades mounted on the ring intermediate the agitating blades and having sharply formed leading and trailing edges, each shear blade extending generally in the direction of the convex face of an adjacent agitating blade and being in the plane of rotation of the agitating blades.

3. A turbine mixer for mixing liquids which comprises a plurality of curved agitating blades integral with and extending outwardly from a centrally disposed hub and uniformly spaced circumferentially, said agitating blades having convex leading faces, a supporting ring integral with the outer extremities of the agitating blades and concentric with the hub, the supporting ring being relatively narrow and having an inner edge spaced an appreciable distance from the hub providing a substantial opening between the agitating blades, the hub, and the ring, and a plurality of shear blades integrally mounted on the ring intermediate the agitating blades and having sharply formed leading and trailing edges, each shear blade extending generally in the direction of the convex face of an adjacent agitating blade, said agitating blades and shear blades being on the same side of the supporting ring and both being rotatable in the same plane.

References Cited in the file of this patent

UNITED STATES PATENTS

| | | |
|---|---|---|
| 499,712 | Collins et al. | June 20, 1893 |
| 1,992,447 | Savy | Feb. 26, 1935 |
| 2,063,789 | Burk | Dec. 8, 1936 |
| 2,289,934 | Rapisarda | July 14, 1942 |

FOREIGN PATENTS

| | | |
|---|---|---|
| 848,103 | France | July 17, 1939 |